(12) United States Patent
Ozkok et al.

(10) Patent No.: US 7,055,897 B2
(45) Date of Patent: Jun. 6, 2006

(54) MOTOR VEHICLE ROOF MODULE WITH INTEGRATED SECURING DEVICE

(75) Inventors: Kerim Ozkok, Unterschleissheim (DE); Michael Konig, Schwabisch Gmund (DE); Hans-Joachim Ludwig, Neckartenzlingen (DE)

(73) Assignee: Decoma (Germany) GmbH, Sulzbach (DE)

( * ) Notice: Subject to any disclaimer, the term of this patent is extended or adjusted under 35 U.S.C. 154(b) by 0 days.

(21) Appl. No.: 10/932,249

(22) Filed: Sep. 1, 2004

(65) Prior Publication Data

US 2005/0045680 A1    Mar. 3, 2005

(30) Foreign Application Priority Data

Sep. 1, 2003    (DE) ................. 103 40 745

(51) Int. Cl.
*B60R 7/00*    (2006.01)
(52) U.S. Cl. ................. 296/210; 224/309; 224/326
(58) Field of Classification Search ............... 296/210; 224/309, 325, 326, 327
See application file for complete search history.

(56) References Cited

U.S. PATENT DOCUMENTS

| | | | | |
|---|---|---|---|---|
| 3,223,302 A | * | 12/1965 | Helm | 224/325 |
| 4,341,332 A | * | 7/1982 | Kowalski et al. | 224/309 |
| 4,406,386 A | * | 9/1983 | Rasor et al. | 224/325 |
| 4,516,710 A | * | 5/1985 | Bott | 224/326 |
| 4,834,448 A | * | 5/1989 | Sakamoto et al. | 296/210 |
| 4,911,348 A | * | 3/1990 | Rasor et al. | 224/325 |
| 4,982,886 A | * | 1/1991 | Cucheran | 224/326 |
| 5,203,483 A | * | 4/1993 | Cucheran | 224/326 |
| 5,207,365 A | * | 5/1993 | Bott | 224/326 |
| 5,411,196 A | * | 5/1995 | Lee et al. | 224/321 |
| 5,511,709 A | * | 4/1996 | Fisch | 224/326 |
| 5,573,161 A | * | 11/1996 | Stapleton | 224/309 |
| 5,715,980 A | * | 2/1998 | Blankenburg et al. | 224/326 |
| 5,730,343 A | * | 3/1998 | Settelmayer | 224/321 |
| 5,732,864 A | * | 3/1998 | Stapleton | 224/309 |
| 5,769,292 A | * | 6/1998 | Cucheran et al. | 224/324 |
| 5,794,826 A | * | 8/1998 | Cronce et al. | 224/309 |
| 5,845,828 A | * | 12/1998 | Settelmayer | 224/321 |
| 6,131,782 A | * | 10/2000 | De Silva et al. | 224/325 |
| 6,216,928 B1 | * | 4/2001 | Blankenburg et al. | 224/326 |
| 6,279,802 B1 | * | 8/2001 | Hickman et al. | 224/326 |
| 6,423,894 B1 | * | 7/2002 | Patz et al. | 296/210 |
| 6,722,541 B1 | * | 4/2004 | Aftanas et al. | 224/327 |
| 6,959,845 B1 | * | 11/2005 | Aftanas et al. | 224/325 |
| 2002/0066760 A1 | * | 6/2002 | Neaux | 224/325 |

* cited by examiner

*Primary Examiner*—Kiran B. Patel
(74) *Attorney, Agent, or Firm*—Clark Hill PLC

(57) ABSTRACT

A roof module of a motor vehicle with at least one securing device for a roof carrier system, the securing device being formed in one piece with the roof module.

18 Claims, 5 Drawing Sheets

MOTOR VEHICLE ROOF MODULE WITH INTEGRATED SECURING DEVICE

FIELD OF THE INVENTION

The invention relates to a roof module of a motor vehicle with a securing device.

BACKGROUND OF THE INVENTION

Roof carrier systems have recently come into use in many motor vehicles as leisure habits have changed. Such roof carrier systems are designed, for example, for mounting ski racks, cycle racks, roof boxes and the like to transport leisure and sports equipment and related accessories. In conventional roof carrier systems there are usually provided two rails that extend on the left and right-hand sides of the roof edge in the longitudinal direction of the vehicle. Such longitudinal rails are constructed from a single member or from multiple members.

Single-member rails comprise an elongated connecting member having at its ends fixing mounts that are bolted to the vehicle roof. This type of construction requires complex fabrication steps to manufacture the rail so as to ensure that the required properties and geometries of a particular design and the necessary mechanical strength and stiffness are obtained.

Multiple-member rails consist substantially of two mount members and a central connecting member inserted between the mount members. Similarly with a multiple-member rail, the mount members are bolted to the vehicle roof and in addition there can be provided intermediate supports likewise bolted to the vehicle roof and suitably attached to the central connecting member.

The conventional rail systems have the significant disadvantage that the vehicle roof has to be provided with appropriate apertures and/or holes to enable the mount members to be fixed to the vehicle roof. With holes of this kind in the vehicle roof, any inadequacy in sealing creates the risk of corrosion which, once it reaches an advanced stage, can result in the mount members breaking off, or at least in a deterioration in the appearance of the vehicle. Also, because they are complex components, conventional rails have to be fabricated in a separate manufacturing step which has the disadvantage of making the roof carrier system more expensive.

Consequently, it is the underlying object of the invention to provide a roof securing system which can be fabricated in a more advantageous manner and which allows greater flexibility with regard to design and function.

SUMMARY OF THE INVENTION

The roof module in accordance with the invention is characterized substantially in that at least one securing device is integrated in one piece within the roof module. Preferably, a plurality of securing devices are integrated into the roof module, for example in pairs lying opposite and facing one another in the longitudinal direction of the vehicle. The securing devices advantageously serve as a receiving means for carrier bars that are formed as roof rails. Alternatively, direct fixtures, such as for example a roof box or the like, can also be attached to the securing devices, so that a roof box can be fixed to the roof module in accordance with the invention without a roof rail.

In an advantageous refinement of the invention, the carrier bars can be removably fastened to the securing devices. For this purpose, there can be provided at the free ends of the carrier bar engaging with a respective securing device, suitable fixing means for example in the form of counter-sinkable socket-head screws, spring-loaded pistons and the like.

Thus, in the roof module in accordance with the invention, the mounts for a carrier bar that is to be attached thereto can be incorporated in an exterior surface of the roof module for example by working the sheet metal by deep-drawing.

Alternatively, the roof module can be fabricated from a plastic consisting of a paint film and a supporting material. This method allows an even greater degree of freedom in the design of the roof module and is extremely economical. The required stiffness and mechanical strength of the roof module in respect of forces transmitted by the roof module to the vehicle body when the vehicle is being driven can be obtained in an extremely advantageous manner by foaming, injecting or stamping the supporting material to the back of the paint film, the supporting material being a polyurethane system, an injection-moulded thermoplastic material, or a glass mat thermoplastic (GMT) or sheet moulding compound (SMC) material.

In particular when fabricated from a plastic as stated hereabove, securing devices in the form of mount members for a roof rail can be integrated in an extremely attractive manner into the external structure of the roof module in accordance with the invention such that the carrier bar placed between two opposite securing devices has at most a small curvature or even no curvature at all, as well as only a small variation or no variation in cross-section. An extruded section or equally a long-fiber reinforced fiber composite plastic is advantageous for the manufacture of a carrier bar of this kind.

In an advantageous refinement of the invention, the securing device has an elongated extension and is for example formed in one piece with or integrated into the roof module on a left and right edge thereof in the longitudinal direction of the vehicle. The securing device has a groove over at least a portion of its longitudinal extension. For example, one securing device is formed respectively on a left and right edge of the roof module, with respective grooves lying opposite one another at substantially the same height. Thus, a cross-rail or the like can be inserted at both its free ends into the respective grooves of the securing devices, the cross-rail preferably being slidable inside the grooves along the longitudinal axis of the vehicle. When a plurality of cross-rails is received or carried in the grooves, a high degree of flexibility is obtained for securing a large variety of roof-top units for transporting sports equipment or the like.

In an advantageous refinement of the invention, the free ends of a cross-rail are inserted direct into a respective groove, the pairing of materials from which the groove and cross-rail are made being suitably matched to give low friction and low wear. To reduce wear still further or to increase durability, a guide track in the form of a U-section or a C-section can be additionally inserted into the groove, this guide track preferably being fabricated from a metal. The guide track is advantageously adhered, tolerance-fitted, bolted or the like into the groove.

In an alternative embodiment, the securing device itself has no groove and the above-described guide track is placed directly on an external surface of the securing device and is fixed thereto in the same manner as described hereabove. It will be appreciated that in the last-mentioned embodiment the roof module preferably has two securing devices, the open sides of the guide tracks attached thereto lying opposite one another at the same height so that cross-rails can be easily received and carried therein.

The roof module in accordance with the invention in which the securing devices have an elongated extension and are arranged for example in the longitudinal direction of the vehicle, can also be advantageously fabricated from a plastics system consisting of a paint film which is described in detail herebelow and a supporting material, the paint film being backed with the supporting material. The paint film is thermoformed or injection molded in a first step. Alternatively, it is also possible to form the paint film from a reactive thermosetting material, for example by rotational molding. The roof module will have the required stiffness and mechanical strength if the supporting material backing the paint film is formed from a polyurethane system, a thermoplastic material, or a GMT or SMC material foamed, injected or stamped into the back of the paint film.

The above-mentioned paint film can advantageously be an extruded thermoplastics film. An external surface of the paint film that forms part of the exterior vehicle surface can be suitably painted, so that there is outwardly no difference from adjacent painted metal parts.

Alternatively, the paint film can be a coextruded thermoplastics film, the film comprising of at least two film layers. Similarly in this embodiment, the paint film in the coextruded sheet form is part of the exterior surface of the vehicle. A suitable coloring is incorporated at least in the film layer that is adjacent to the exterior vehicle surface, so that the color obtained preferably matches the paint applied to the adjacent painted metal parts. Thus, with a coextruded paint film of this kind, a separate painting step is unnecessary. However, the coextruded film can if necessary be painted, for example for an even more accurate color match with the vehicle paintwork.

Integrating the securing device into the roof module, for example as mount members for a separate roof rail, or alternatively as the longitudinal extension described hereabove, allows the roof module to be assembled in a very advantageous and visually extremely attractive manner on the adjacent vehicle body beams by means of a so-called zero-tolerance joint, with the roof module lying flush with the vehicle body. Suitable fastening methods, for example adhesion and the like, are well-known to the person skilled in the art. Conventional weld channels extending along the roof beams on the longitudinal axis of the vehicle can thus be avoided. Also, conventional sealing or lining means used to conceal weld channels can be omitted.

Other advantages and configurations of the invention will be apparent from the description and the accompanying drawings.

It will be appreciated that the features that have been mentioned above and those described below can be used not only in the combination that is described in each instance, but also in other combinations, or alone, without departing from the invention.

BRIEF DESCRIPTION OF THE DRAWINGS

An example of the invention is shown diagrammatically in the drawings and described in detail below with reference to the drawings, in which.

DETAILED DESCRIPTION OF THE PREFERRED EMBODIMENTS

Figure 1:
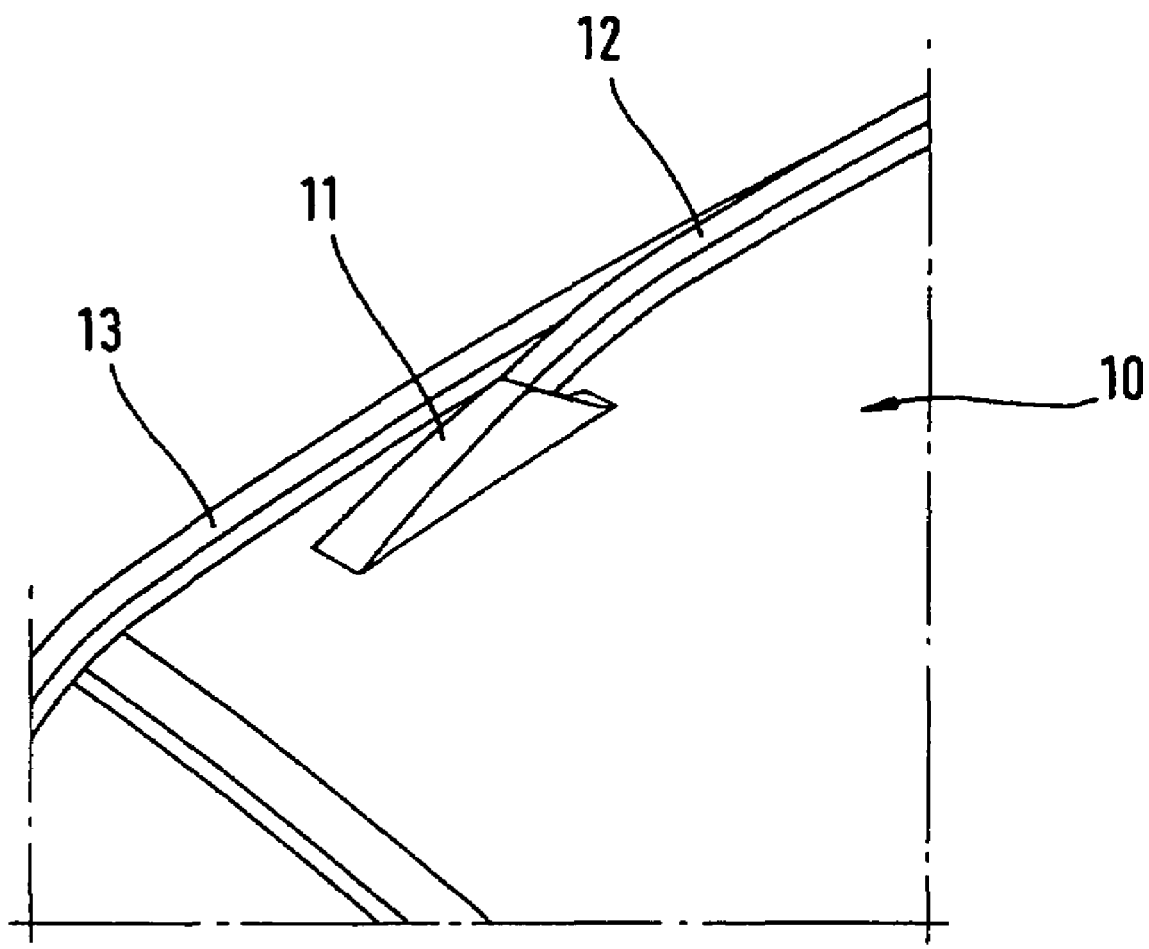
FIG. 1 is a perspective top view of a partial detail of a roof module in accordance with the invention in the front right-hand region near an A-pillar of a motor vehicle.

In FIG. 1, a roof module 10 in accordance with the invention is shown in a partial detail perspective view. A securing device 11 is integrated in one piece with the roof module 10, as a mounting member for a roof rail which is fixed as a carrier bar 12 between two opposite securing devices 11. The carrier bar 12, which can preferably consist of an extruded section or a long-fiber reinforced fiber composite component, is fixedly or detachably connected to the securing devices 11, depending on customer requirements.

The roof module 10 is mounted on the adjacent roof beams 13 of the vehicle body in such a way as to lie flush therewith. Thus, the roof module 10 in accordance with the invention can be assembled seamlessly, so that conventional weld channels or the like can be avoided.

Alternatively, the roof module in accordance with the invention can also be mounted on the roof region of the vehicle body such that a gap is formed on the vehicle exterior between the roof module and the body. A gap of this kind can be suitably covered with a decorative trim or the like so as not to detract from the aesthetics of the vehicle.

Figure 2:
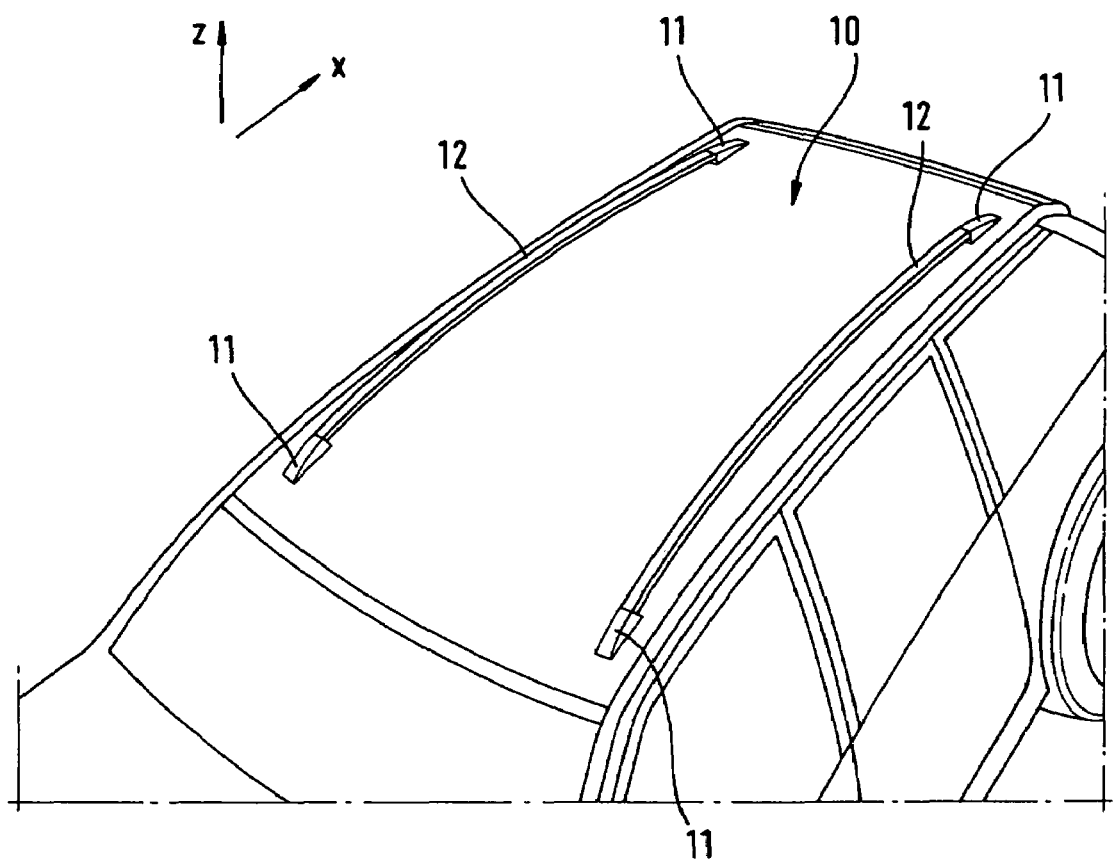
FIG. 2 is a perspective overall top view of a roof module in accordance with the invention in the assembled condition.

FIG. 2 is a perspective view of the whole surface of the roof module 10. In this example, a total of four securing devices 11 are integrated into the roof module 10, each substantially in one corner region of the roof module 10. The securing devices 11 are arranged in pairs so that a carrier bar 12 can be mounted between these securing devices 11 in the longitudinal direction of the vehicle, in other words in direction x. The securing devices 11 are advantageously formed in the roof module 10 in such a manner that no appreciable curvature, variations in cross-section or the like are required, which makes the fabrication of such carrier bars more economical. The attachment of the carrier bar 12 to the securing devices 11 is described below with reference to FIG. 3.

In the securing device 11 there is provided a blind hole 14 directed towards another, opposite securing device 11. After the roof module 10 has been fabricated as a flat component for example by deep-drawing a metal sheet or by thermoforming a paint film followed by the injection, foaming or stamping of a supporting material to the back of the paint film, a hole of the aforesaid kind is made in the securing device 11 in a subsequent fabrication step. At one free end 15 of the carrier bar 12 there are provided in a suitable recess spring-loaded pistons 16 which project from the free end of the carrier bar when there is no load on the spring 17.

The free end of the carrier bar 12 has an external contour that conforms to the corresponding seating surface of the securing device 11. When the carrier bar 12 is to be attached to the securing device 11, an appropriate means such as for example a gripping ring or the like is used to apply force to the spring in direction x, such that the piston 16 is drawn into the free end of the carrier bar 12. When the piston 16 is inside the free end of the carrier bar 12, the free end of the carrier bar 12 can be placed on the seating surface of the securing device 11. When the load on the spring 17 is subsequently released, in other words when piston 16 slides back to its starting position in the direction opposite to direction x, a portion of the piston engages with the blind hole 14, thereby locking the free end of the carrier bar 12 to the securing device 11 of the roof module 10. A carrier bar 12 can thus be removably fastened to the securing devices 11. Alternatively, it is also possible to attach the carrier bar 12 to the securing devices 11 by means of a screw-adjustable piston, screw fasteners or the like, instead of a spring-loaded piston.

Figure 3:
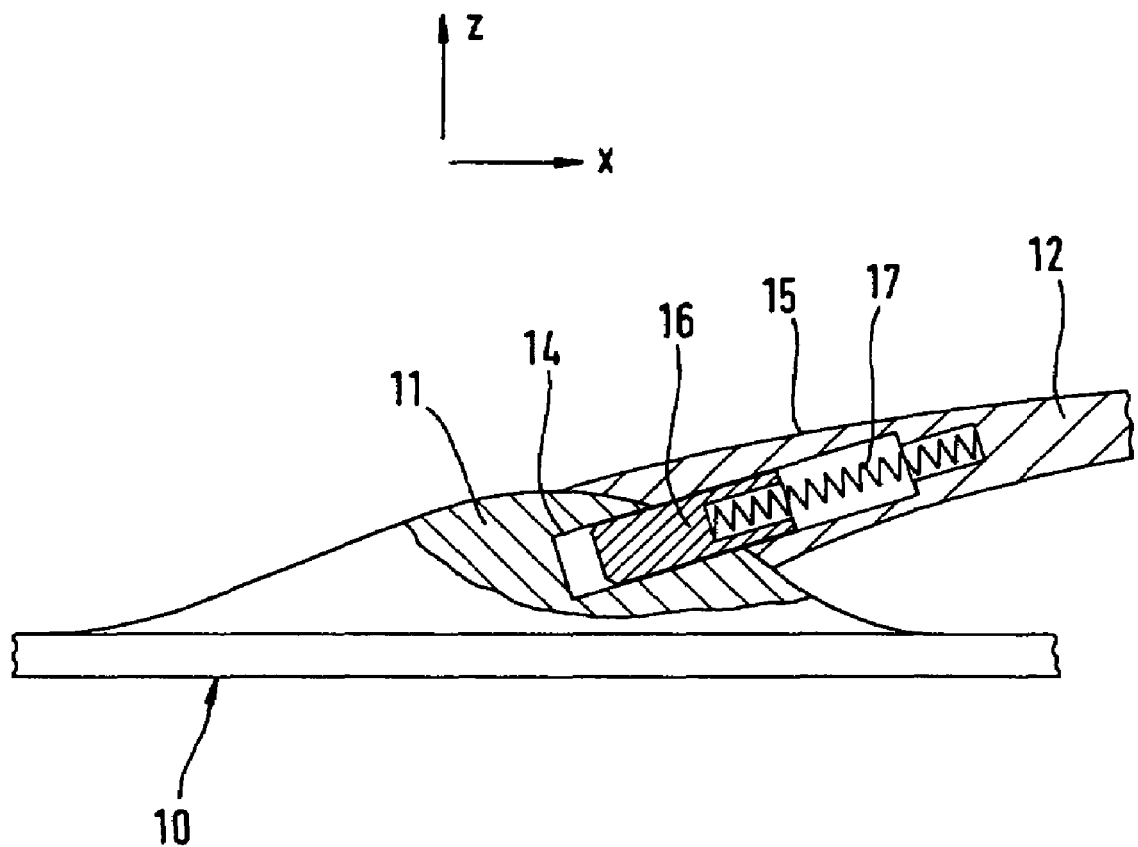
FIG. 3 is a side cross-sectional view of a securing device integrated into the roof module in accordance with the invention.

In the sectional view shown in FIG. 3 it will also be seen that integrating the securing device 11 into the roof module 10 can provide a high degree of design freedom combined with a highly attractive appearance.

Figure 4:
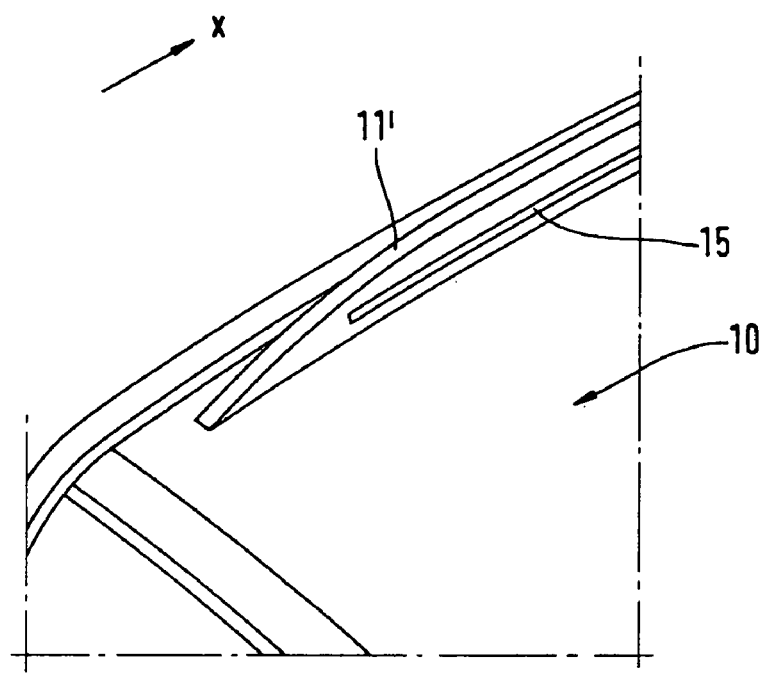
FIG. 4 is a perspective view of a partial detail of another embodiment of the roof module in accordance with the invention.

FIG. 4, similarly to the illustration of FIG. 1, shows another embodiment of the roof module 10 in accordance with the invention in which the securing device 11' has a longitudinal extension along the longitudinal axis of the vehicle, in other words in direction x. In the embodiment shown here, the securing device 11' is formed on a left edge and on a right edge of the roof module 10 along the longitudinal axis of the vehicle. On an inner side of the securing device 11', in other words on a side facing the center of the vehicle, there is formed a groove 15 which is described below in greater detail with reference to FIG. 5.

Figure 5:
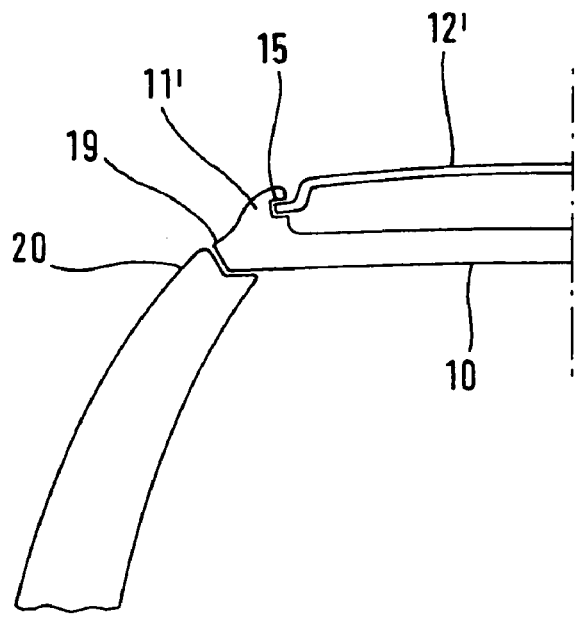
FIG. 5 is a cross-sectional side view of the roof module of FIG. 4.

FIG. 5 shows a cross-sectional side view of the roof module 10 of FIG. 4. The securing device 11' is integrated as a projection on an edge of the roof module 10 and has, on an inner side facing the center of the vehicle, a groove 15. The groove 15 can preferably have the shape of a U-section. The securing devices 11' extending on the respective edges of the roof module have grooves 15 arranged at the same height, enabling a carrier bar 12' to be fitted therein at its free ends to form a cross-rail. The free ends of the cross-rail 12' engage in the groove 15 whose depth is sufficiently great to provide a secure fit for the cross-rail 12'. In order to reduce frictional resistance between the free ends of the cross-rail 12' and the contact surfaces of groove 15, there can also be provided a guide track preferably made of metal which is suitably fastened inside the groove 15 and so forms the contact surface for the free ends of the cross-rail 12'.

Alternatively, the securing device 11' can also be formed without a groove 15, so that in place thereof, only a guide track in the form of a C-section or U-section is suitably attached by adhesion or the like to the side of the securing device 11' that faces the center of the vehicle.

Figure 6:
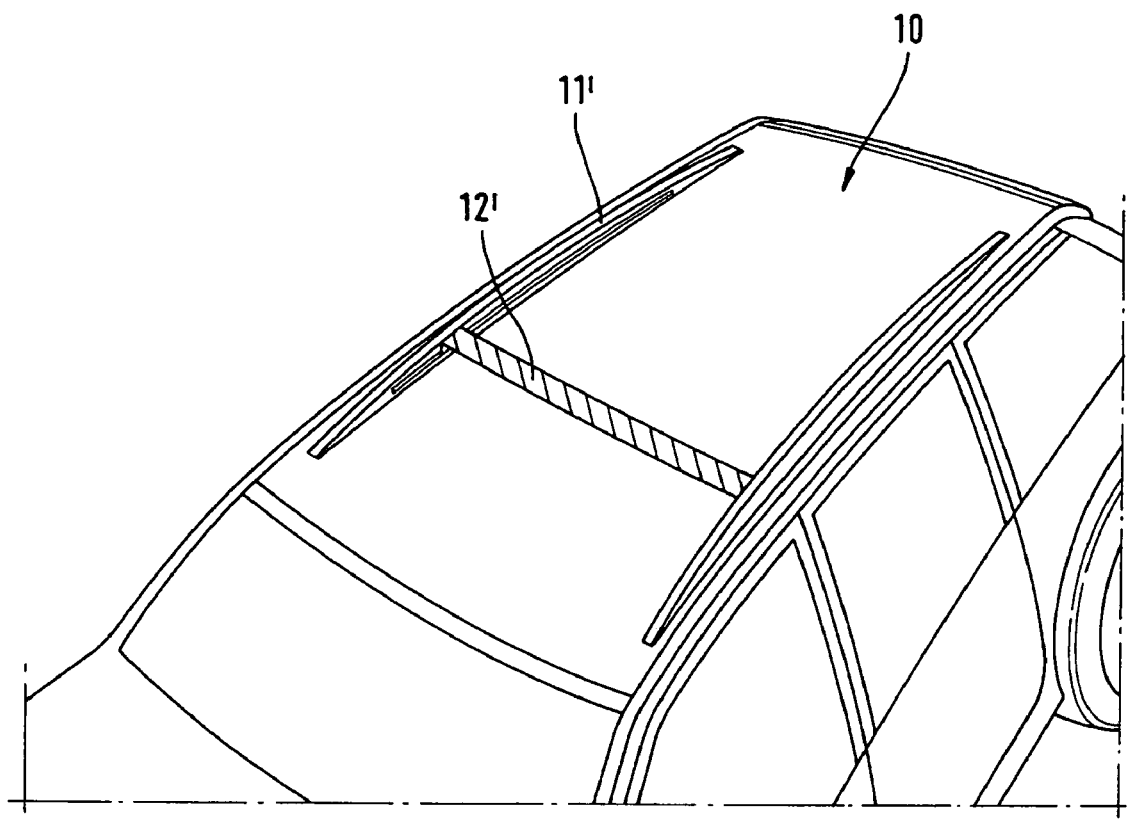
FIG. 6 is an overall perspective view of the roof module of FIGS. 4 and 5.

The overall perspective top view in FIG. 6 of the roof module 10 in accordance with the invention of FIGS. 4 and 5 shows, as the hatched element, a carrier bar 12' taking the form of a cross-rail fitted at both its ends inside the grooves or guide tracks of the securing devices 11'. When a plurality of cross-rails 12' is arranged or slidably fitted between the securing devices 11', a very great variation of securing points can be advantageously obtained for a roof carrier system mounted on or fixed to the cross-rails 12'.

Another advantage of the roof module 10 in accordance with the invention is that by integrating the securing device 11, 11' in an upper external surface of the roof module, the roof module can be seamlessly mounted on an adjacent roof beam 20 of the vehicle body. This means that an edge 19 of the roof module 10 formed along a longitudinal side thereof lies flush with the roof beam 20. A weld channel which would otherwise be necessary when mounting a conventional roof module to an adjacent roof beam can thus be advantageously avoided.

Alternatively, the roof module 10 in accordance with the invention can also be attached to the roof region of the vehicle body such that a gap is formed on an exterior vehicle surface between the roof module and the adjacent parts of the body. A gap of this kind can preferably be covered by a decorative trim or the like whose underside conforms with the gap. The trim can be suitably fitted into the gap or adhered, bolted or fastened by other fastening means.

As already described hereinabove, the roof module 10 in accordance with the invention can be formed for example by working or deep-drawing a metal sheet. Alternatively, the roof module can also be made from a plastic consisting of a paint film and a supporting material backing the paint film. An appropriate supporting material gives the paint film or the roof module as a whole the required stiffness and strength that are needed in the vehicle body and that are essential for transmitting to the vehicle body the forces that occur in the securing devices when the vehicle is driven.

The above-described embodiments of the invention are intended to be examples of the present invention and numerous modifications, variations, and adaptations may be made to the particular embodiments of the invention without departing from the scope of the invention, which is defined in the claims.

The invention claimed is:

1. A roof carrier system for use with a motor vehicle, said roof carrier system comprising:
    a roof module;
    at least one pair of spaced apart securing devices integrated with said roof module, said securing devices blind hole defined therein;
    a carrier bar extending between free ends, said free ends having a recess defined therein; and
    a spring-loaded piston disposed within each said recess, said spring-loaded pistons releasably engageable with said blind holes of said securing devices for removably coupling said carrier bar with said securing devices.

2. The roof carrier system as set forth in claim 1 wherein said at least one pair of spaced apart securing devices integrated with said roof module are disposed along a longitudinal axis of the motor vehicle opposite one another.

3. The roof carrier system according to claim 2, wherein the securing devices (11') are elongated and have a groove (15) along at least a portion of their extension, which is adapted to receive a carrier bar (12') and lie opposite and facing one another.

4. The roof carrier system according to claim 3, wherein a guide track is inserted into each of the grooves (15).

5. The roof carrier system according to claim 3, wherein the guide tracks are arranged on a surface of the securing devices (11).

6. The roof carrier system according to claim 5, wherein the guide tracks are in particular made from sheet metal.

7. The roof carrier system according to claim 3, wherein the securing devices (11') are arranged in the longitudinal direction of the vehicle and take the form of a roof rail.

8. The roof carrier system according to claim 3, wherein at least one carrier bar (12') is inserted in the grooves.

9. The roof carrier system according to claim 8, wherein the carrier bar (12') is slidable in the longitudinal direction along the extension of the securing devices (11').

10. The roof carrier system as set forth in claim 2 wherein said carrier bar is a fiber-reinforced structural component made of plastic.

11. The roof carrier system as set forth in claim 10 wherein said roof module is fabricated from sheet metal, said securing devices being formed on an exterior surface of said roof module by a sheet-metal working method.

12. The roof carrier system as set forth in claim 11 wherein said sheet-metal working method is deep-drawing.

13. The roof carrier system as set forth in claim 12 wherein said roof module is fabricated from a plastic, said plastic consisting of a paint film with a supporting material backing said paint film.

14. The A roof carrier system as set forth in claim 13 wherein said paint film is thermoformed, injection molded or fabricated from a reactive thermosetting material.

15. The A roof carrier system as set forth in claim 14 wherein said supporting material consists of a polyurethane system, a thermoplastic material or a glass mat thermoplastic or sheet molding compound material which is foamed, injected or stamped to the back of said paint film.

16. The roof carrier system as set forth in claim 15 wherein said roof module is fixedly secured to roof beams of the motor vehicle.

17. The roof carrier system as set forth in claim 16 wherein said roof module is fixedly secured to said roof beams by way of a zero-tolerance joint.

18. The roof carrier system as set forth in claim 17 wherein a gap is formed on an exterior motor vehicle surface between said roof module and the motor vehicle which is covered by a decorative trim.

* * * * *